United States Patent [19]

Laursen

[11] 4,093,767

[45] June 6, 1978

[54] COPY SHEET SUITABLE FOR THERMOCOPYING

[75] Inventor: Einar Munk Laursen, Rodovre, Denmark

[73] Assignee: Memofax A/S, Copenhagen, Denmark

[21] Appl. No.: 691,835

[22] Filed: Jun. 1, 1976

[30] Foreign Application Priority Data

Jun. 3, 1975 Denmark ............................ 2473/75

[51] Int. Cl.$^2$ ................................................ B32B 3/02

[52] U.S. Cl. ...................................... 428/194; 428/40; 428/101; 428/198; 428/200; 428/913

[58] Field of Search ........................... 282/22 R, 23 R; 281/21 R; 428/40, 101, 194, 198, 200, 913

[56] References Cited

U.S. PATENT DOCUMENTS

| | | | |
|---|---|---|---|
| 2,397,090 | 7/1959 | Van Dam | 428/913 |
| 2,503,680 | 4/1950 | Newman | 282/22 R |
| 3,037,795 | 6/1962 | Blair | 282/22 R |
| 3,088,754 | 5/1963 | Burgmer | 282/22 R |
| 3,177,086 | 4/1965 | Newman et al. | 428/913 |
| 3,241,997 | 3/1966 | Schützner | 428/913 |
| 3,389,011 | 6/1968 | Svensson | 428/913 |
| 3,413,138 | 11/1968 | Georgalas et al. | 428/913 |
| 3,682,740 | 8/1972 | Newton | 281/21 R |
| 3,953,659 | 4/1976 | Truitt | 428/913 |

*Primary Examiner*—William R. Dixon, Jr.
*Attorney, Agent, or Firm*—Lackenbach, Lilling & Siegel

[57] ABSTRACT

A copy sheet suitable for thermocopying, containing an adhesive in at least one margin of the sheet, and a method for determining proper thermocopier adjustment by superimposing an original sheet over the copy sheet to form a set, and passing the set through the thermocopier a sufficient number of times, as determined by the production of a satisfactory copy of the original sheet.

3 Claims, 3 Drawing Figures

COPY SHEET SUITABLE FOR THERMOCOPYING

In thermocopying the time during which the copy material is exposed to the action of heat is rather critical, and the optimum time depends on many factors, i.a. the nature and quality of the original. Therefore, thermocopiers are usually arranged so as to allow continuous or stepped variation of the rate at which the copy material is passed through the machine. However, it is difficult to judge accurately in advance which setting will produce the best result, and where a thermocopier, as is often the case, is used by persons with little experience in such copying work, the operator is often forced to find the proper setting by trial and error. Such a procedure results in a considerable waste of copy paper.

The present invention relates to a copy sheet suitable for thermocopying and the object thereof is to provide a copy sheet that will facilitate the production of good copies without waste of paper.

This object is achieved by applying to at least one margin of the copy sheet a preferably heat-responsive adhesive as the adhesive will fix the original and the copy sheet relative to each other, thus making it possible to pass them through the copier a number of times without the text of the copy becoming double or merely blurred as a result of relative displacements. This means that one can proceed by the method of trial and error until the result is satisfactory without waste of copy sheets because the same copy sheet is used for all the trials.

Only very little adhesiveness is required, which makes it easy to separate the original and copy sheet after copying is completed. The adhesive may also be pressure-sensitive, if desired.

In one advantageous embodiment of the copy sheet according to the invention the adhesive is applied in the form of one or more patches.

In a second advantageous embodiment the copy sheet incorporates a heat-responsive adhesive which has a response time which is less than the exposure time of the copy sheet.

Figure 1:
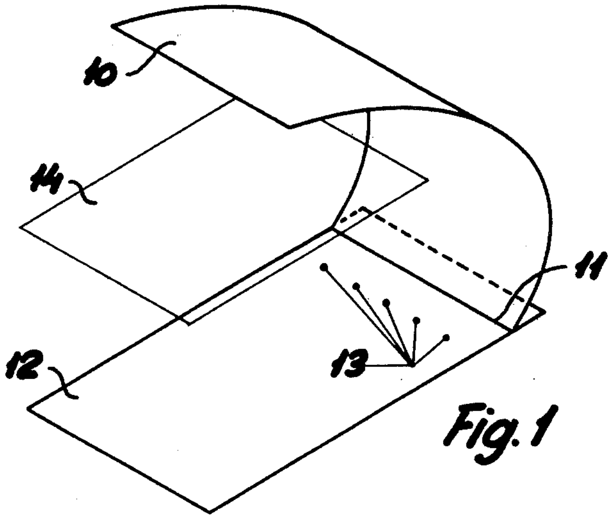
Figure 2:
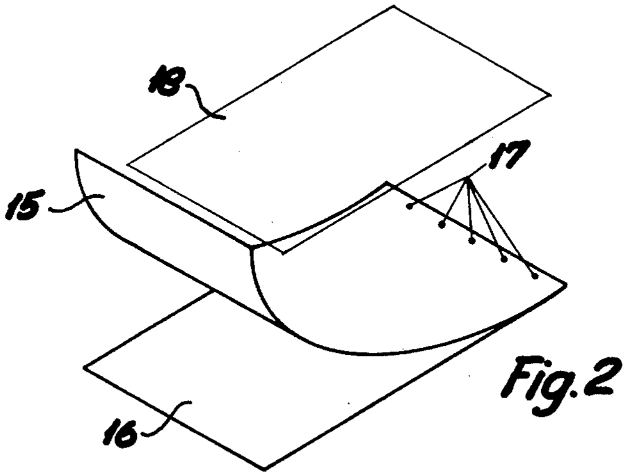
Figure 3:
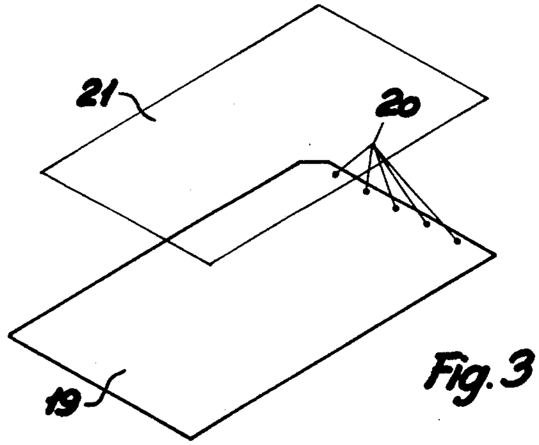

The invention will be further explained as follows with reference to the drawing in which FIGS. 1 to 3 are perspective views of various embodiments of copy sheets according to the invention together with originals separated from the copy sheets.

FIG. 1 shows a set of copy material in the form of a thermostencil sheet 10 attached along one terminal margin 11 to a back sheet 12 which adjacent and along the margin 11 is provided with a number of small adhesive patches 13, these being preferably of a heat-sensitive adhesive. After interposing an original 14 between the stencil sheet 10 and the back sheet 12 and passing the set of sheets through a thermocopier the adhesive patches 13 will be activated by the heat transmitted and fix the original in a firm position relatively to the stencil. This fixation means that the set of sheets may, if necessary, be passed through the machine a number of times without any displacement between copy sheet and original with resultant blurring or double reproduction in the copy produced.

FIG. 2 shows a copy set comprising a set comprising a sheet of melt paper 15 coated with ink material which melts by heating and an ink receiving sheet 16. These sheets are interconnected along one margin, and the top of the melt sheet 15 is provided along the said margin with a number of adhesive patches 17 for fixing an original 18. The ink recipient may be an ink transparency or a spirit master.

FIG. 3 shows a sheet of thermopaper 19 having a number of adhesive patches 20 for fixation along one terminal margin and an orginal 21.

The adhesiveness of the adhesive should not be so strong as to render it difficult to separate original and copy sheet after copying. Under the given conditions its response time should be less than the exposure time of the copy sheet to make certain of adhesion even if the machine is set at too short an exposure time.

What we claim is:

1. A thermocopying copy sheet containing in at least one margin a heat responsive adhesive adapted to be activated by the heat transmitted by a thermocopier as the copy sheet and a superimposed original pass therethrough so as to releasably affix the original to the copy sheet so as to prevent movement of the original relative to the copy sheet.

2. A copy sheet according to claim 1, characterized in that the adhesive is applied in the form of two or more patches.

3. A copy sheet according to claim 1 incorporating a heat-responsive adhesive, characterized in that the adhesive has a response time which is less than the exposure time of the copy sheet.

* * * * *